United States Patent
Touge et al.

[11] Patent Number: 6,134,961
[45] Date of Patent: Oct. 24, 2000

[54] ANGULAR VELOCITY SENSOR

[75] Inventors: Hiroshi Touge, Ichinomiya; Manabu Katoh, Nagoya; Shinichi Harada, Toyota, all of Japan

[73] Assignee: Aisin Seiki Kabushiki Kaisha, Kariya, Japan

[21] Appl. No.: 09/339,107

[22] Filed: Jun. 24, 1999

[30] Foreign Application Priority Data

Jun. 24, 1998 [JP] Japan .................. 10-176992

[51] Int. Cl.$^7$ .................................................. G01P 9/00
[52] U.S. Cl. ........................ 73/504.12; 73/504.16; 73/504.04
[58] Field of Search ................ 73/504.04, 504.03, 73/504.02, 504.16, 504.12

[56] References Cited

U.S. PATENT DOCUMENTS

| | | |
|---|---|---|
| 5,349,855 | 9/1994 | Bernstein et al. . |
| 5,635,638 | 6/1997 | Geen . |
| 5,908,986 | 6/1999 | Mitamura .............. 73/504.12 |
| 5,992,233 | 11/1999 | Clark ..................... 73/514.35 |

FOREIGN PATENT DOCUMENTS

| | | |
|---|---|---|
| 5-248872 | 9/1993 | Japan . |
| 7-218268 | 8/1995 | Japan . |
| 8-152327 | 6/1996 | Japan . |
| 9-42973 | 2/1997 | Japan . |
| 9-127148 | 5/1997 | Japan . |

*Primary Examiner*—Richard A. Moller
*Attorney, Agent, or Firm*—Burns, Doane, Swecker & Mathis, LLP

[57] ABSTRACT

An angular velocity sensor includes coupling beams supported afloat by highly flexible support beams so as to be movable relative to a substrate, with the support beams being flexible in the x-axis and a y-axis directions and being symmetrical with respect to the center of the sensor. A first vibrator and a second vibrator are supported by respective coupling beams through spring beams that are highly flexible in the x-direction, with the spring beams being symmetrical with respect to the x-axis passing through the center symmetrical to each other with respect to the y-axis passing through the center. Drive electrodes drive at least one of the first vibrator and the second vibrator to vibrate in the x-direction. First displacement detection electrodes detect a y-directional vibration of the first vibrator and second displacement detection electrodes detect a y-directional vibration of the second vibrator. Precision with respect to detecting the angular velocity is prevented from being lowered by electrical and mechanical disturbances.

8 Claims, 7 Drawing Sheets

(a) DRIVE SIGNAL A (b) DRIVE SIGNAL B (c) DRIVE FEEDBACK SIGNAL (LEAKAGE NOISE OF DRIVE SIGNAL)   ---: Before amplification   —: After differential amplification (d) ANGULAR VELOCITY SIGNAL (LEAKAGE NOISE OF DRIVE SIGNAL)   ---: Before amplification   —: After differential amplification (e) X - DIRECTIONAL VIBRATION (f) Y - DIRECTIONAL VIBRATION 6,134,961

ANGULAR VELOCITY SENSOR

This application is based on and claims priority under 35 U.S.C. § 119 with respect to Japanese Application No. 10(1998)-176992 filed on Jun. 24, 1998, the entire content of which is incorporated herein by reference.

FIELD OF THE INVENTION

The present invention generally relates to an angular velocity sensor. More specifically, the present invention pertains to an angular velocity sensor having a mass or vibrator which is supported in a floating manner with respect to a substrate. The angular velocity sensor may be of the type in which a floating semiconductor thin film formed by semiconductor micromachining technology is oscillated in an x-direction by electrically attracting/releasing it by way of comblike electrodes.

BACKGROUND OF THE INVENTION

Known types of angular velocity sensors include a floating comblike electrode (with one set of comb fingers or segments) at the left latus part of a floating thin film and a floating comblike electrode (with one set of comb fingers) at the right latus part of the floating thin film (left floating comb-like electrode and right floating comb-like electrode). Fixed comblike electrodes are provided and have two sets of comb fingers, a left fixed comb-like electrode and a right fixed comb-like electrode whose fingers interdigitate with the respective sets of fingers of the left and right floating comb-like electrodes in a non-contacting parallel fashion. The floating thin film is vibrated in an x-direction by applying voltages alternately between the left floating comblike electrode and the left fixed comb-like electrode, and between the right floating comb-like electrode and the right fixed comb-like electrode. When the angular velocity of rotation about a z-axis acts on the floating thin film, this floating thin film is subjected to a Coriolis force, and the floating thin film undergoes an elliptic vibration in which it is also vibrated in the y-direction. When the floating thin film is made of an electric conductor or when an electrode is joined to the floating thin film, and when a detection electrode parallel to the xz-plane of the floating thin film is disposed on a substrate beforehand, the capacitance between the detection electrode and the floating thin film fluctuates or changes in correspondence with the y-component (angular velocity component) of the elliptic vibration. The angular velocity can be found by measuring the change (amplitude) of the capacitance. Angular velocity sensors of this type are described in, for example, Japanese Patent Application Laid-Open No. 248872/1993, Japanese Patent Application Laid-Open No. 218268/1995, Japanese Patent Application Laid-Open No. 152327/1996, Japanese Patent Application Laid-Open No. 127148/1997, and Japanese Patent Application Laid-Open No. 42973/1997.

U.S. Pat. No. 5,635,638 discloses an angular velocity sensor in which, as shown in FIG. 4 of the patent, a pair of vibrators are coupled by a pair of semicircular beams, with the pair of vibrators being supported by eight anchors through the beams which are highly flexible or bendable in the vibrating direction x of the respective vibrators.

The angular velocity sensor has separate multipoint anchor portions which are distant from one another. Therefore, when subjected to an external force associated with a temperature change or the like, each of the beam spring portions for moving the vibrator as a simple harmonic motion undergoes a compressive or tensile stress. For this reason, the resonance frequency of the vibrator changes with temperature and exhibits hysteresis characteristics having discontinuous points. This undesirably lowers the precision of the sensor.

With known angular velocity sensors having separate multipoint anchor portions as disclosed in, for example, Japanese Patent Application Laid-Open No. 218268/1995, it is found that the vibration of the vibrator during driving operation will leak into the vibration at the detection side due to the distant anchor portions, and so the precision will lower. Also, with the known angular velocity sensor in which the immobile points of a driving vibration mode and a detecting vibration mode do not coincide, as disclosed in, for example, Japanese Patent Application Laid-Open No. 218268/1995, it is found that the detection precision for an angular velocity will be reduced under the influences of the external force and the vibration leakages between the two modes. Moreover, when a vibrating component diminishing the vibration based on the Coriolis force is contained in the driving vibration mode, the detection output of the angular velocity is small. In this regard, there is an occasion where the vibration of the vibrator in the prior art becomes unstable due to different amplitudes in the +x-direction and −x-direction, and this is undesirable.

With the angular velocity sensor disclosed in U.S. Pat. No. 5,635,638, oscillating springs are not connected to the center of gravity of each of the vibrators. It is therefore conjectured that the vibrations of the vibrators will become unbalanced when drive forces exerted on oscillating masses are nonuniform due to a discrepancy in manufacturing dimensions. Additionally, the vibrations become nonlinear. The unstable fluctuations of the detection outputs are accordingly incurred by the unbalance of the shift fluctuations of the resonance frequencies of the vibrators, and so the S/N ratio (signal-to-noise) of the angular velocity signal will be inferior. Also, because a vibration driving signal travels to a detecting capacitor, the S/N ratio of the angular velocity signal will be lowered. Further, with the known sensor, leakage of the driving oscillation flow as leakage signals to the respective detecting portions. In this regard, because electrical distances and geometrical distances from an oscillating portion to the respective detecting portions are not symmetrical, the leakage signals cannot be eliminated even by contriving or providing the operations of an electric circuit portion. A degradation in the S/N ratio is thus brought about.

In light of the foregoing, a need exists for an angular velocity sensor that is able to prevent the detection precision from being lowered due to physical (electrical and mechanical) disturbances.

A need also exists for an angular velocity sensor that is able to suppress the degradation of the signal-to-noise ratio associated with leaks of the vibration driving signal, to thereby heighten the detection precision for the angular velocity sensor.

SUMMARY OF THE INVENTION

According to one aspect of the invention, an angular velocity sensor includes a loop spring beam which is flexible in the x-axis direction and the y-axis direction, and which is supported by floating support members so as to be adapted to be vibrated in directions extending along an xy-plane relative to a substrate, and an oscillation device for driving at least one of the points of the loop spring beam that intersect with the x-axis and the y-axis so as to vibrate in the extending direction of the. A first drive frame and a second drive frame are continuous with respective intersection points of the loop spring beam with the x-axis and lie at positions symmetric with respect to the y-axis. The first and second drive frames are supported afloat to be movable relative to the substrate by support members that are flexible in the extending direction of the x-axis. A first vibrator is disposed in the first drive frame and is continuous with the spring beams that are flexible in the y-direction as well as the first drive frame. A second vibrator is disposed in the second drive frame and is continuous with spring beams that are flexible in the y-direction and continuous with the second drive frame. A first displacement detection device detects a y-directional vibration of the first vibrator and a second displacement detection device detects a y-directional vibration of the second vibrator.

According to the present invention, when at least one of the intersection points of the loop spring beam with the x-axis and y-axis, for example the intersection points with the y-axis, are driven to vibrate in the extending direction of the y-axis by the oscillation device, the x-directional vibrations in which the phases shift 180 degrees from those of the y-directional vibrations appear at the intersection points of the loop spring beam with the x-axis, and the first drive frame and second drive frame vibrate in opposite phases in the x-direction. Likewise, the first vibrator and the second vibrator vibrate in opposite phases in the x-direction. When an angular velocity acts around a z-axis, the vibrations of the first vibrator and the second vibrator become elliptic vibrations in which the vibrators and vibrate also in the y-direction, for the reason that these vibrators are supported by the spring beams which are highly flexible in the y-direction. Because the x-directional vibrations of the first vibrator and the second vibrator are in relatively opposite phases, the y-directional vibrations thereof are in opposite phases relative to each other. The first and second displacement detection devices detect the y-directional vibrations.

When the vibration detection signals of the first and second displacement detection devices are differentially amplified, a vibration detection signal at a level which is approximately double the level of the vibration detection signal of each displacement detection device is obtained. Simultaneously, electrical noise is reduced and signal components associated with any mechanical disturbance other than the angular velocity are canceled from each other. By way of example, in a case where an acceleration or a deceleration has acted in the y-direction, the resulting movements of the first vibrator and the second vibrator are in the same sense, and the levels of the displacement detection signals of the first and second displacement detection devices fluctuate to the same extent in the same sense. However, when the displacement detection signals are differentially amplified, the fluctuations of the signal levels are canceled from each other. Accordingly, the S/N ratio of the angular velocity signal is not degraded by disturbances such as the acceleration.

The loop spring beam is supported by the floating support members so as to be adapted to be vibrated in the directions extending along the xy-plane, relative to the substrate. Moreover, the first drive frame and the second drive frame are supported afloat to move relative to the substrate by the support members which are highly flexible in the extending direction of the x-axis. Therefore, the first drive frame and the second drive frame are not highly susceptible to temperature distortions, and the x-directional vibrations of the frames and the first and second vibrators are stabilized. In addition, the first and second vibrators are supported afloat through the spring beams which are highly flexible in the y-direction. Therefore, the first and second vibrators are not significantly susceptible to temperature distortions, and their y-directional vibrations corresponding to the angular velocity are stabilized. Thus, the reliability (stability) of the angular velocity signal is high.

When the intersection points of the loop spring beam with the y-axis are driven to vibrate in the extending direction of the y-axis by the oscillation device, the first and second vibrators are equally distant from the corresponding intersection points. Therefore, the leakage of the oscillating drive signals to the first and second displacement detection devices becomes equal, and they are canceled by the differential amplification mentioned above. It is accordingly possible to obtain the angular velocity detection signal having a high S/N ratio.

When the intersection points of the loop spring beam with the x-axis are driven to vibrate in the x-direction, the two intersection points with the x-axis are respectively driven to vibrate by the pair of oscillation devices to thereby equalize the distances between the individual oscillation devices and the corresponding displacement detection devices. It is accordingly possible to similarly obtain the angular-velocity detection signal of high S/N ratio.

The angular velocity sensor of the present invention may further include a third drive frame and a fourth drive frame which are respectively continuous with the intersection points of the loop spring beam with the y-axis, and are supported afloat so as to be movable relative to the substrate by support members that are highly flexible in the extending direction of the y-axis. The third drive frame and fourth drive frame lie at positions that are symmetrical with respect to the x-axis. A third vibrator is disposed in and continuous with the third drive frame and is continuous with spring beams that are highly flexible in the x-direction. A fourth vibrator is disposed in the fourth drive frame, is continuous with spring beams that are highly flexible in the x-direction, and is continuous with the fourth drive frame. A third displacement detection device detects the x-directional vibration of the third vibrator, and a fourth displacement detection device detects an x-directional vibration of the fourth vibrator.

According to the present invention, signals similar to the displacement detection signals of the first and second displacement detection devices are also obtained by the third and fourth displacement detection devices. The signals of the third and fourth displacement detection devices are differentially amplified, and the resulting signal is added to the differential amplification signal of the first and second displacement detection devices in a phased state, whereby an angular velocity signal of high S/N ratio is obtained at a high level. Also, the first thru fourth drive frames and the first thru fourth vibrators are combined into sets, each consisting of one drive frame and one vibrator, and the respective sets are located at intervals of 90 degrees around the center of the sensor so as to be symmetric with respect to the x-axis and y-axis, whereby the angular velocity signal of high S/N ratio and high reliability (stability) is obtained and is little affected by a temperature change, electric noise, and a disturbing acceleration, deceleration or vibration.

The vibrators are preferably members each being in the shape of a frame, and the displacement detection devices are located inside the respective vibrators. The floating support members include spring beams which lie on the x-axis and y-axis, and are highly flexible in the extending directions of the axes. Also, the floating support members include a frame member with which the spring beams that are highly flexible in the extending directions of the axes are continuous. The spring beams are highly flexible in the directions of the x-axis and y-axis, and each is continuous to the frame member at one end and is fixed to the substrate at the other end.

According to another aspect of the invention, an angular velocity sensor includes coupling beams supported afloat to be movable relative to a substrate by floating support members that are highly flexible in the directions of the x-axis and the y-axis and symmetrical with respect to the center 0 of the sensor. A first vibrator and a second vibrator are respectively supported by the coupling beams through spring beams that are highly flexible in the x-direction, each of which is symmetric with respect to the x-axis passing through the center, and symmetric to each other with respect to the y-axis passing through the center. An oscillation device drives one or both of the first and second vibrators so as to vibrate in the x-direction. A first displacement detection device detects a y-directional vibration of the first vibrator, and a second displacement detection device detects a y-directional vibration of the second vibrator.

In a preferred embodiment of the present invention, the elements of the angular velocity sensor are arrayed entirely in point symmetry with respect to the center of the sensor. With this construction, notwithstanding that the drive frames and the vibrators are anchored at multiple points, the symmetry with respect to the center is prevented from collapsing, by releasing thermal expansion, internal stresses, etc., and the reliability (stability) of the angular velocity signal is thus quite high.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
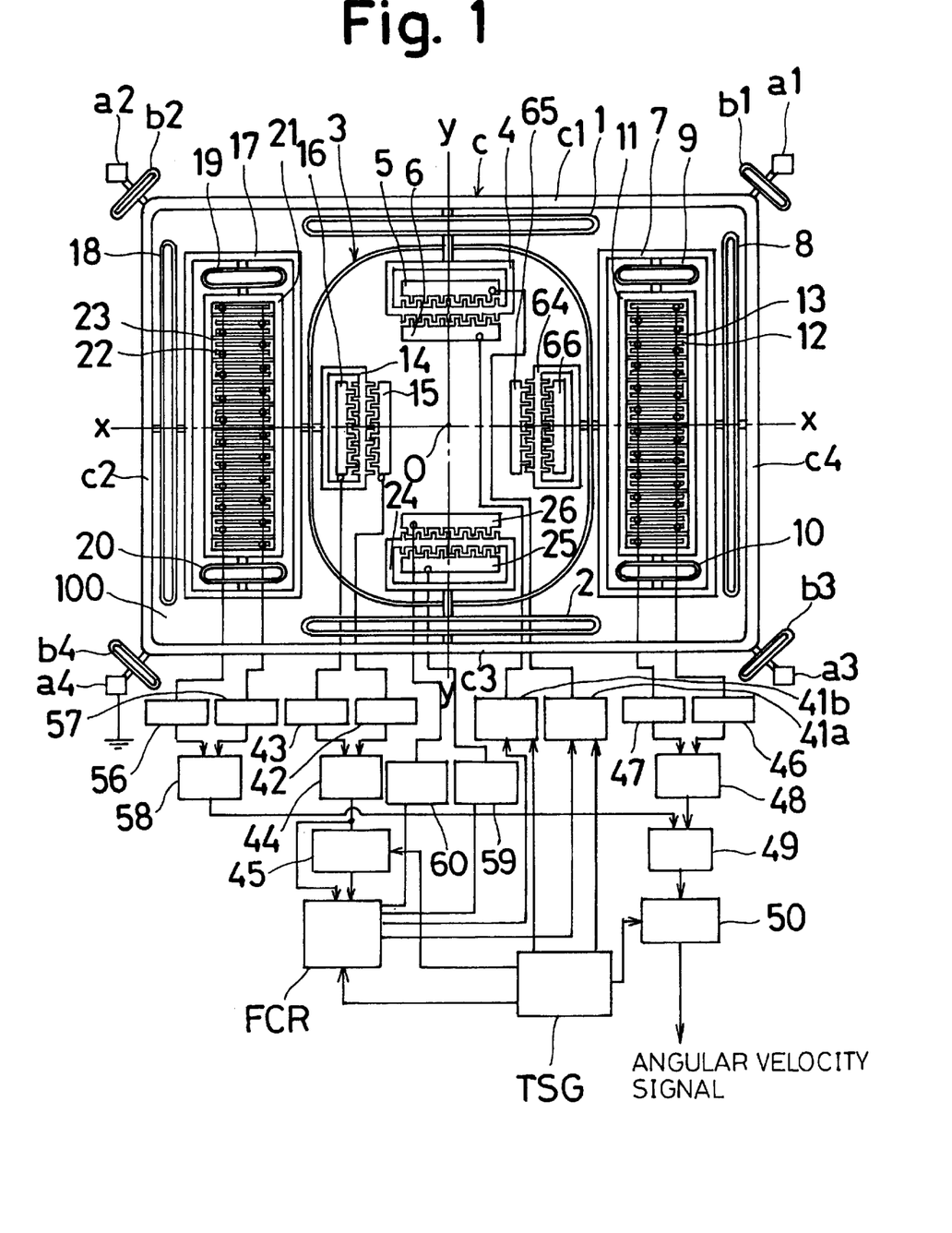
FIG. 1 is a plan view of an angular velocity sensor according to a first embodiment of the present invention, including a diagrammatic illustration of various components.

FIG. 1 illustrates the angular velocity sensor according to a first embodiment of the present invention. The angular velocity sensor includes drive electrodes 5, 6, drive detection electrodes 15, 16, angular-velocity detection electrodes 12, 13 and 22, 23, frequency adjustment electrodes 25, 26, and dummy electrodes 65, 66.

In this embodiment, anchors are joined to a silicon substrate 100 formed with an insulator layer. The anchors are made of polycrystalline silicon which contains an impurity for establishing a conductivity (hereinbelow, termed conductive polycrystalline silicon). The anchors include floater anchors a1, a2, a3, a4, anchors for the drive electrodes 5, 6, anchors for the drive detection electrodes 15, 16, anchors for the angular-velocity detection electrodes 12, 13 and 22, 23, anchors for the frequency adjustment electrodes 25, 26, and anchors for the dummy electrodes 65, 66 which are respectively located at positions symmetric to the drive detection electrodes 15, 16. These anchors, except the anchors 65, 66, are connected to connection electrodes (not specifically illustrated) by wiring lines which are formed on the insulator layer overlying the silicon substrate 100.

Using a lithographic semiconductor process, spring beams b1, b2, b3, b4 of conductive polycrystalline silicon, each of which is in the shape of a flattened ring situated at an angle of 45 degrees to the x-axis as shown in FIG. 1, are formed to be afloat from the silicon substrate 100 and to be continuous to the respective corresponding floater anchors a1, a2, a3, a4. Similarly formed is a coupling frame c which is in the shape of a rectangular loop continuous to the spring beams b1~b4. The coupling frame c is symmetric with respect to the x-axis and the y-axis which pass through the center 0 of the sensor. The floater anchors a1, a2, a3, a4 and the spring beams b1, b2, b3, b4 connected to the coupling frame c are distributed symmetrically with respect to the x-axis and the y-axis.

Two spring beams 1, 2 each in the shape of a flattened ring are respectively connected to and continuous with the midpoints of the adjoining two lateral sides c1, c3 of the coupling frame c which are parallel to the x-axis. A quadrilateral loop 3 forming a loop spring beam having round corners is connected to and continuous with both of the spring beams 1, 2, and y-axial vibration frames 4, 24 are connected to and continuous with the respective spring beams 1, 2. X-axial vibration frames 14, 64 are connected to and continuous with those points of the quadrilateral loop 3 which intersect the x-axis. A first drive frame 7 and a second drive frame 17 are also connected to and continuous with the intersection points at which the quadrilateral loop 3 intersects the x-axis. The first and second drive frames 7, 17 are rectangular frames, the other intersection points of which with the x-axis are respectively connected to and continuous through spring beams 8, 18 having a flattened ring shape to the midpoints of those two latera or sides c4, c2 of the coupling frame c which are parallel to the y-axis. A first vibrator 11 and a second vibrator 21 are respectively connected to and continuous with the inner sides of the first drive frame 7 and the second drive frame 17 through spring beams 9, 10 and 19, 20 having a flattened ring-shape. Also these constituents are afloat from the silicon substrate 100 and are made of conductive polycrystalline silicon.

The first and second drive frames 7, 17, and the first and second vibrators 11, 21 are symmetrical in shape and are symmetrically positioned with respect to the x-axis and the y-axis which pass through the center 0 of the sensor. The spring beams 1, 2, 8, 18, 9, 10, 19, 20 are also symmetric with respect to and symmetrically disposed with respect to the x-axis and the y-axis.

Each of the y-axial vibration frames 4, 24 includes a comb-like movable electrode whose fingers or segments are distributed at equal pitches in the direction of the x-axis and extend or protrude in the direction of the y-axis. On the other hand, each of the drive electrodes 5, 6 and the frequency adjustment electrodes 25, 26, which are made of the conductive polycrystalline silicon and which are connected to and continuous with the corresponding electrode anchors, includes a comb-like fixed electrode whose fingers are distributed in the x-direction and protrude in the interspaces of the x-directional distribution of the fingers of the movable electrode.

Voltages which are higher than the potential of the y-axial vibration frame 4 (being substantially equal to the earth potential level of the equipment including the sensor), are applied alternately to the drive electrodes 5, 6, whereby the y-axial vibration frame 4 is vibrated in the y-direction. Owing to the vibration in the y-direction of the y-axial vibration frame 4, the two latera or sides of the quadrilateral loop 3 parallel to the x-axis are vibrated in the y-direction, and the y-axial vibration frame 24 partly interposed between the frequency adjustment electrodes 25, 26 is vibrated in the y-direction. Further, the drive frames 7, 17 and the x-axial vibration frames 14, 64 are vibrated in the x-direction with a phase difference of 180 degrees from the y-directional vibration of the frame 24. The y-directional vibrations of the y-axial vibration frames 4, 24 are in opposite phases relative to each other. The x-directional vibrations of the x-axial vibration frames 14, 64 are also in opposite phases relative to each other so that the first drive frame 7 and the second drive frame 17 perform tuning fork vibrations. The first vibrator 11 and the second vibrator 21 which are respectively supported by the first drive frame 7 and the second drive frame 17 are similarly vibrated in the x-direction in opposite phases. That is, they perform tuning fork vibrations.

A first vibration system consisting of the drive frame 7 and the vibrator 11, and a second vibration system consisting of the drive frame 17 and the vibrator 21, are caused to perform the tuning fork vibrations in this manner, thereby to attain an x-directional oscillation of high energy consumption efficiency.

Because the x-axial vibration frame 14 (64) is vibrated in the x-direction together with the drive frame 17 (7), the capacitances between the drive frame 17 and the drive detection electrodes 15, 16 fluctuate, and the capacitances between the drive frame 64 and the drive detection electrodes 65, 66 also fluctuate in phases opposite to those of the capacitance fluctuations relating to the drive frame 17.

Each of the vibrators 11, 21 is substantially in the shape of a frame, in which a plurality of gangway or separating beams extending in the x-direction are spaced apart at equal pitches in the y-direction. One pair of fixed detection electrodes 12, 13 and 22, 23 of conductive polycrystalline silicon exists in the interspace between each pair of gangway beams that are adjacent to each other in the y-direction. These electrodes are supported by the respectively corresponding anchors for the detection electrodes on the substrate 100, and are electrically connected to and continuous with the anchors.

Although each pair of detection electrodes 12, 13 (22, 23) is insulated from each other, those detection electrodes of the pairs of detection electrodes 12, 13 (22 and 23) which are associated for detecting the y-directional vibration (y-directional displacement) of the vibrator 11 (21) are connected in common to an electric lead and then to charge amplifiers 46, 47 (56 and 57) as shown in FIG. 1.

When an angular velocity around the z-axis passing through the center 0 of the sensor acts during the x-directional fork vibrations of the vibrators 11, 21, these vibrators 11, 21 come to perform elliptic vibrations which also have y-axial components and which are in relatively opposite phases. Thus, the electrodes 12, 13 and 22, 23 undergo capacitance fluctuations corresponding to the y-directional vibrations. The capacitance fluctuations of the electrodes 12, 13 are in relatively opposite phases, and those of the electrodes 22, 23 are similarly in relatively opposite phases. Here, because the y-directional vibrations of the vibrators 11, 21 are in opposite phases, the capacitance fluctuations of the electrodes 12, 22 are in relatively opposite phases, and those of the electrodes 13, 23 are similarly in relatively opposite phases.

The movable electrodes of the y-axial vibration frame 24 and the fixed electrodes of the frequency adjustment electrodes 25, 26 function to adjust the velocities (spring forces) of the y-directional vibrations of the two latera or sides of the quadrilateral loop 3 parallel to the x-axis (and the x-directional vibrations of the two latera thereof parallel to the y-axis, and the x-directional vibrations of the drive frame 7, 17, all the vibrations being forced by the y-directional vibrations of the two latera of the quadrilateral loop 3) and to lower the vibration frequencies of the drive frames 7, 17 down to values which are lower on the order of several hundred Hz relative to the resonance frequencies of the vibrators 1, 21. The drive frames 7, 17 are oscillated in the x-direction at frequencies equivalent to their natural vibration frequencies by applying drive voltages. To heighten a sensitivity for detecting the angular velocity, the resonance frequencies (natural vibration frequencies) of the vibrators 11, 21 are designed to be several hundred Hz higher than the resonance frequencies (natural vibration frequencies) of the drive frames 7, 17, and voltages proportional to the displacements of the x-axial vibration frame 14 (the displacements being zero at the rest point of the frame 14 and being taken in the +x and −x-directions) are applied to the frequency adjustment electrodes 25, 26 to adjust the levels of the voltages, whereby the resonance frequencies of the drive frames 7, 17 are finely adjusted to values near the designed value thereof.

Figure 7:
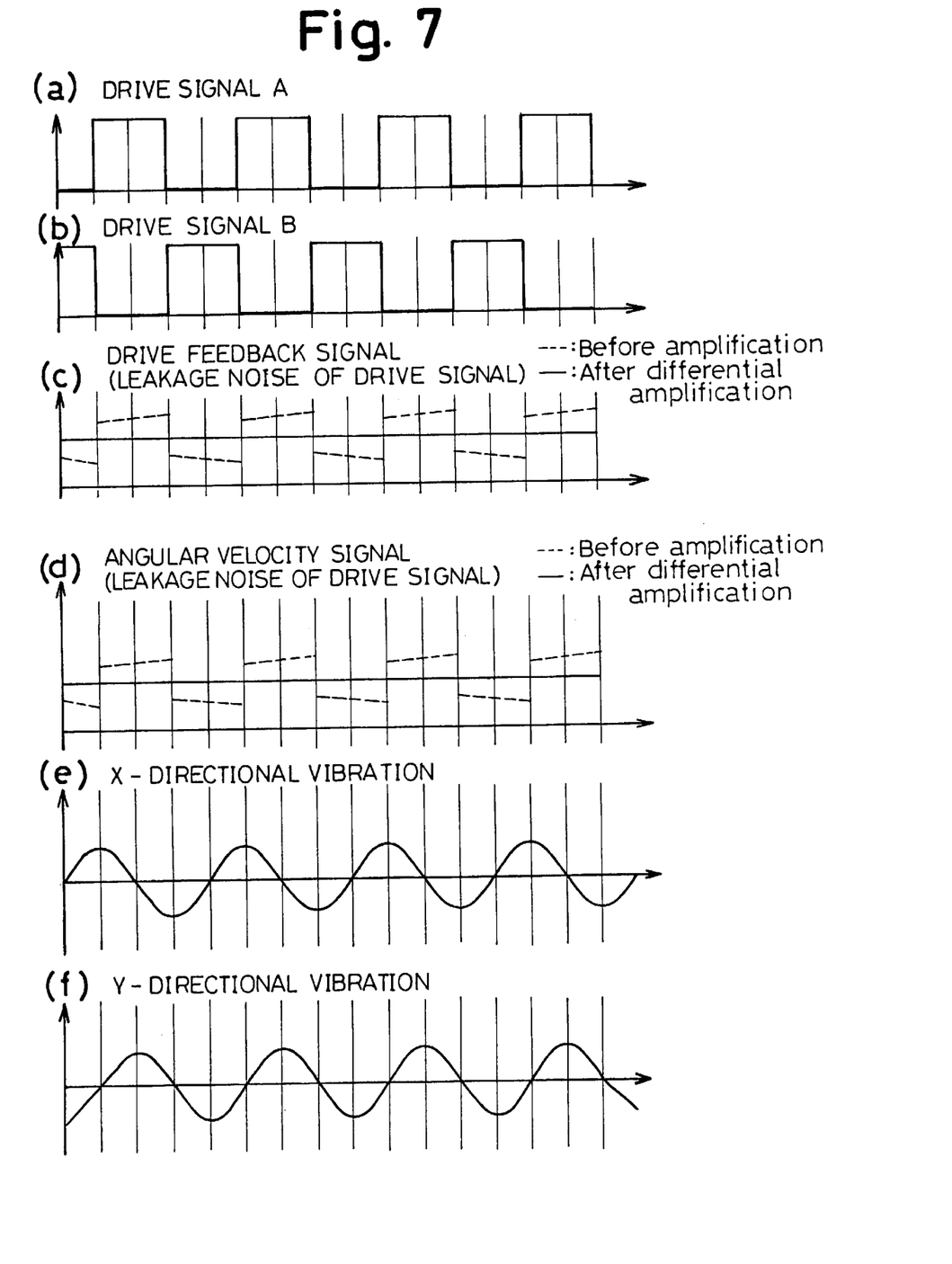
FIG. 7(a) is a timing chart explaining the operation of the angular-velocity detection circuit in each of the first thru sixth embodiments and illustrating the drive voltage applied to one of the drive electrodes by the associated drive circuit.
FIG. 7(b) is a timing chart explaining the operation of the angular-velocity detection circuit in each of the first thru sixth embodiments and illustrating the drive voltage applied to the other drive electrodes by the associated drive circuit.
FIG. 7(c) is a timing chart explaining the operation of the angular-velocity detection circuit in each of the first thru sixth embodiments and illustrating the output signal of one synchronous detection circuit.
FIG. 7(d) is a timing chart explaining the operation of the angular-velocity detection circuit in each of the first thru sixth embodiments and illustrating the output signal of another synchronous detection circuit.
FIG. 7(e) is a timing chart explaining the operation of the angular-velocity detection circuit in each of the first thru sixth embodiments and illustrating the output signal of one differential amplifier.
FIG. 7(f) is a timing chart explaining the operation of the angular-velocity detection circuit in each of the first thru sixth embodiments and illustrating the output signal of the other differential amplifier.

An angular-velocity detection circuit, including electric elements 41*a*–60, the timing signal generator TSG and the feedback processing circuit FCR as shown in FIG. 1, is connected to the angular velocity sensor which includes the mechanical elements described above. The timing signal generator TSG generates drive signals A and B for driving the drive frames 7, 17 at the resonance frequencies in the x-direction, to apply the generated signals to the drive circuits 41*a* and 41*b*. The TSG also applies synchronizing signals for synchronous detection to the synchronous detection circuits 45, 50. FIG. 7 illustrates the drive signals A and B, a drive feedback signal as well as an angular velocity signal, and x-directional and y-directional vibrations. The drive circuits 41*a*, 41*b* apply drive voltages (pulses) to the drive electrodes 5, 6 in synchronism with the respective drive signals A and B. Thus the vibrators 11, 21 are vibrated in opposite phases in the x-direction together with the respective corresponding drive frames 7, 17 through the quadrilateral loop 3. Owing to the vibrations, the capacitances of the drive detection electrodes 15, 16 fluctuate in opposite phases. The charge amplifiers 42, 43 convert the fluctuations of the capacitances into voltage fluctuations (capacitance signals).

The differential amplifier 44 differentially amplifies the capacitance signals (in opposite phases) of the amplifiers 42, 43. The differential amplifier 44 generates a differential signal in which the amplitude of the capacitance signal produced by one charge amplifier is substantially doubled, and in which the noise components of the capacitance signals are canceled from each other. The generated differential signal is applied to the synchronous detection circuit 45 and the feedback processing circuit FCR. The synchronous detection circuit 45 detects the differential signal applied by the differential amplifier 44, namely an x-directional vibration detection voltage expressive of the x-directional vibration, in synchronism with a synchronizing signal inphase with the drive signal. It generates a feedback signal which expresses the phase difference of the x-directional vibration relative to the drive pulse signal. The generated feedback signal is applied to the feedback processing circuit FCR.

The feedback processing circuit FCR supplies the drive circuits 41*a*, 41*b* with phase shift signals for bringing the levels of the phase difference signals applied by the synchronous detection circuit 45 into agreement with preset values. The drive circuits 41*a*, 41*b* having received the phase shift signals shift the phases of the output drive voltages relative to the drive signals, in correspondence with the phase shift signals. In a state where the phase difference signal levels of the synchronous detection circuit 45 have substantially equalized to the preset values, the x-directional vibrations of the drive frames 7, 17 are stabilized. The frequency adjustment circuits 59, 60 apply D.C. voltages to the respective frequency adjustment electrodes 25, 26. The D.C. voltages serve to lower the vibration frequencies of the drive frames 7, 17 to values which are several hundred Hz lower than the resonance frequencies (designed values) of the respective vibrators 11, 21.

When an angular velocity around the z-axis passing through the center 0 acts during the stable resonant fork vibrations, Coriolis forces act on the drive frames 7, 17 and the vibrators 11, 21, which are caused to perform elliptic vibrations containing y-directional vibrations in addition to the x-directional vibrations. Herein, the drive frames 7, 17 are supported by the respective spring beams 8, 18 which are highly flexible in the x-direction but highly rigid in the y-direction, and the two latera or sides of the quadrilateral loop 3 parallel to the y-axis, so that they vibrate little in the y-direction. In contrast, the vibrators 11, 21 are supported by the spring beams 9, 10 and 19, 20 which are highly flexible in the y-direction and so they vibrate greatly in the y-direction. The y-directional vibrations of the vibrators 11, 21 are in opposite phases relative to each other.

The capacitances of the pair of detection electrodes 12, 13 for detecting the y-directional vibration of the vibrator 11 fluctuate in opposite phases, and the charge amplifiers 46, 47 generate capacitance signals expressive of the fluctuations. The differential amplifier 48 generates the differential signal of both the capacitance signals, that is the differential signal in which the amplitude of the capacitance signal generated by one charge amplifier is substantially doubled and in which the noise components of the capacitance signals are canceled from each other. The generated differential signal is applied to the differential amplifier 49. On the other hand, the capacitances of the pair of detection electrodes 22, 23 for detecting the y-directional vibration of the vibrator 21 fluctuate in opposite phases, and the charge amplifiers 56, 57 generate capacitance signals expressive of the fluctuations. The differential amplifier 58 generates the differential signal of both the capacitance signals, that is the differential signal in which the amplitude of the capacitance signal generated by one charge amplifier is substantially doubled and in which the noise components of the capacitance signals are canceled from each other. The generated differential signal is applied to the differential amplifier 49. The differential amplification signals of the differential amplifiers 49, 58 are in opposite phases relative to each other. Accordingly, the differential output of the differential amplifier 49 is a detection signal in which the y-directional vibration caused by the angular velocity is amplified by canceling noise components that simultaneously act on the correspondent signal processing circuits of the first vibrator 11 and the second vibrator 21 at substantially the same levels and by canceling the y-directional displacement components (being also noise components) of the first and second vibrators 11, 21 that simultaneously act on these vibrators in the same senses on account of any disturbance such as acceleration, deceleration or vibration. The detection signal affords a high sensitivity for detecting the angular velocity, and a high S/N ratio.

The differential output, namely the detection signal, is applied to the synchronous detection circuit 50 which detects the detection signal in synchronism with a synchronizing signal inphase with the drive signal and which generates a signal expressive of the angular velocity. The polarity (±) of the angular velocity signal represents the direction of the angular velocity having acted, while the absolute value of the level of the signal represents the magnitude of the angular velocity.

As stated above, the angular velocity sensor of the first embodiment has a dual resonant fork structure of vibration type and is characterized in that improvements in temperature characteristics and enhancement of the S/N ratio have been realized. To improve the temperature characteristics, the coupling frame c being also a protective frame is provided, and the increase of a stress attributed to the difference of the thermal expansions of the substrate 100 and the vibrators (3, 7, 17, 11, 21) is relieved by the coupling frame c and the spring beams b1, b2, b3, b4. More specifically, the difference of the thermal expansions of the substrate 100 and the vibrators (3, 7, 17, 11, 21, 14, 64) is absorbed by the spring shape of the spring beams b1, b2, b3, b4. Because the spring beam is in the form of a loop shape, it has no hysteresis when the expansion associated with temperature is absorbed by the elongation and contraction of the spring. Therefore, the temperature characteristics are improved still more.

The spring beam 3 which connects the two vibrators (7, 11 and 17, 21) located inside the coupling frame c forming a protective frame, is in a shape near or approximating an annulus and is capable of vibration in simple harmonic motion having a linearity. In addition, the x-directional vibrations of the drive frame 7, the vibrator 11 and the drive frame 64, and the drive frame 17, the vibrator 21 and the drive frame 14 make possible the drive in opposite phase owing to the characteristics of the spring beam 3. These vibrators are connected by the four spring beams 1, 2, 8, 18 with the protective frame, whereby the stress is relaxed. Therefore, the driving vibration in the x-direction becomes the linear simple harmonic motion.

The configuration of the drive section is such that the oscillating portion (drive frame 14, spring beam 3) is separate from the vibrators (7, 17, 11, 21, 14, 64) and it is arranged so as to be equally distant from the two vibrators (7, 11, 64 and (17, 21, 14). The detection sections (64, 65, 66 and 14, 15, 16) for driving displacements are connected to the intersection points of the spring 3 with the x-axis and y-axis. This makes possible a configuration which diminishes the leakage of the drive signals to the driving-displacement detection sections (64, 65, 66 and 14, 15, 16) for feeding back the driving displacements of the vibrators, and in which the leakage signals leak as inphase components. Therefore, the S/N ratios of the detection sections can be enhanced.

The sections 9-13 and 19-23 for detecting the angular velocity are constructed of the vibrators 11 and 21 which are connected to the loop-shaped spring beams 9, 10 and 19, 20 inside the drive frames 7 and 17, and the fixed electrodes 12, 13 and 22, 23 which detect the y-directional displacements of the vibrators. Owing to this construction, in the vibration mode of the y-directional vibrations corresponding to the angular velocity, the drive frames 7 and 17 and the vibrators 11 and 21 operate in opposite phases so that a balance is held. In this construction, therefore, the leakage of the vibrations for detecting the angular velocity are almost negligible, and the S/N ratio of the detection is enhanced. Additionally, the vibrations for detecting the angular velocity may well be inphase.

Figure 2:
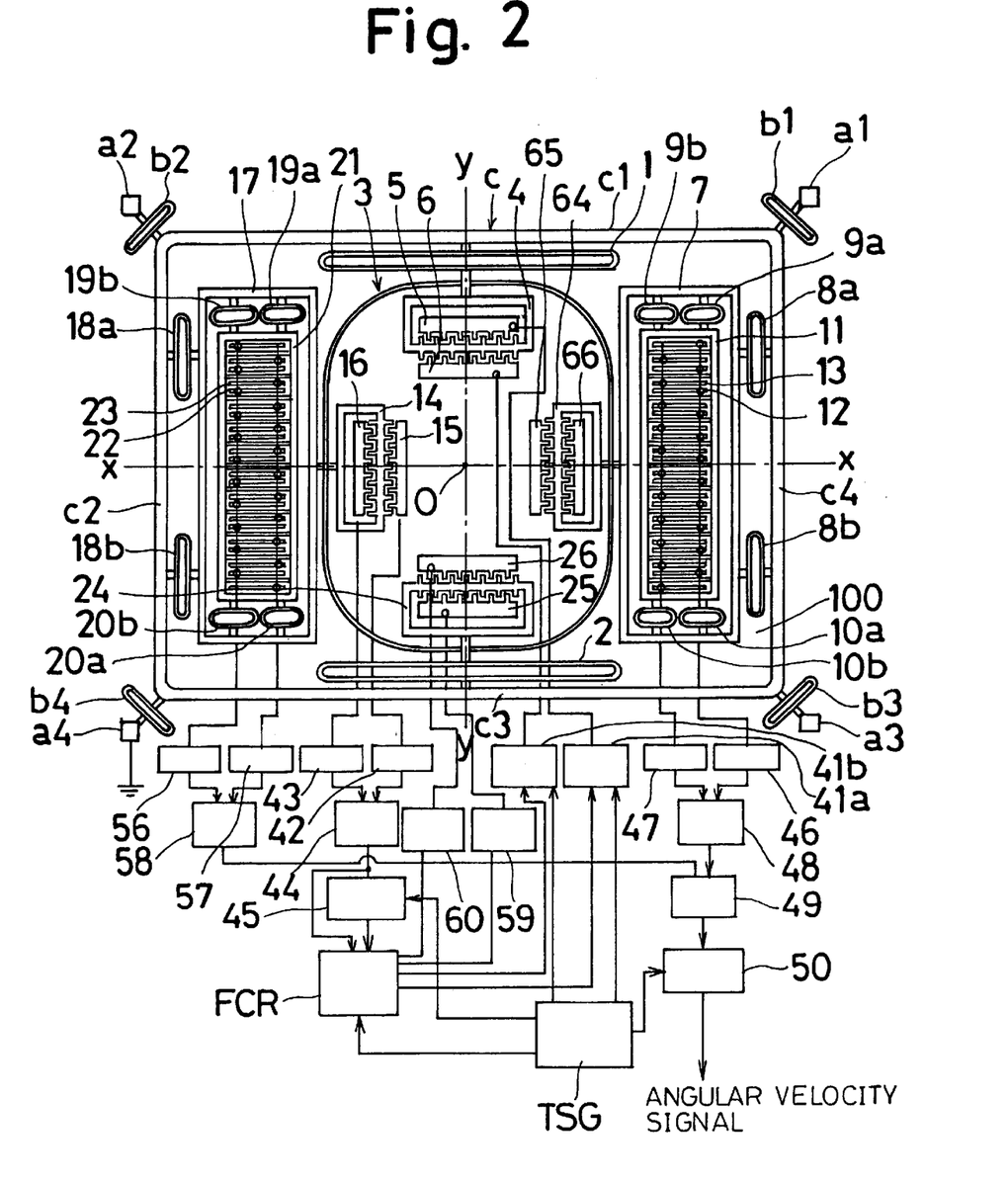
FIG. 2 is a plan view of an angular velocity sensor according to a second embodiment of the present invention, including a diagrammatic illustration of various components.

FIG. 2 illustrates the angular velocity sensor according to the second embodiment of the present invention. According to the second embodiment, in order to enhance suppression of the y-directional vibrations of the first and second drive frames 7, 17, each of the flat loop spring beams 8, 18 associated with the first embodiment is divided into two beams 8a, 8 and 18a, 18b, which are arranged at positions symmetric with respect to the x-axis. That is, the beams 8a, 8b are symmetrically positioned on either side of the x-axis and the beams 18a, 18b are symmetrically positioned on either side of the x-axis. Also, to enhance suppression of the x-directional vibrations of the first and second vibrators 11, 22, each of the flat loop spring beams 9, 10 and 19, 20 associated with the first embodiment is divided into two beams 9a, 9b, 10a, 10b, 19a, 19b, 20a, 20b. The two beams forming each pair of beams 9a/9b, 10a/10b, 19a/19b, 20a/20b are arranged at positions symmetric with respect to the center line of the corresponding vibrator and parallel to the y-axis. Thus, the driving vibrations in the direction of the x-axis are effectively separated from vibrations in the direction of the y-axis as are to be detected for sensing an angular velocity, and the S/N ratio of an angular velocity signal is enhanced.

Figure 3:
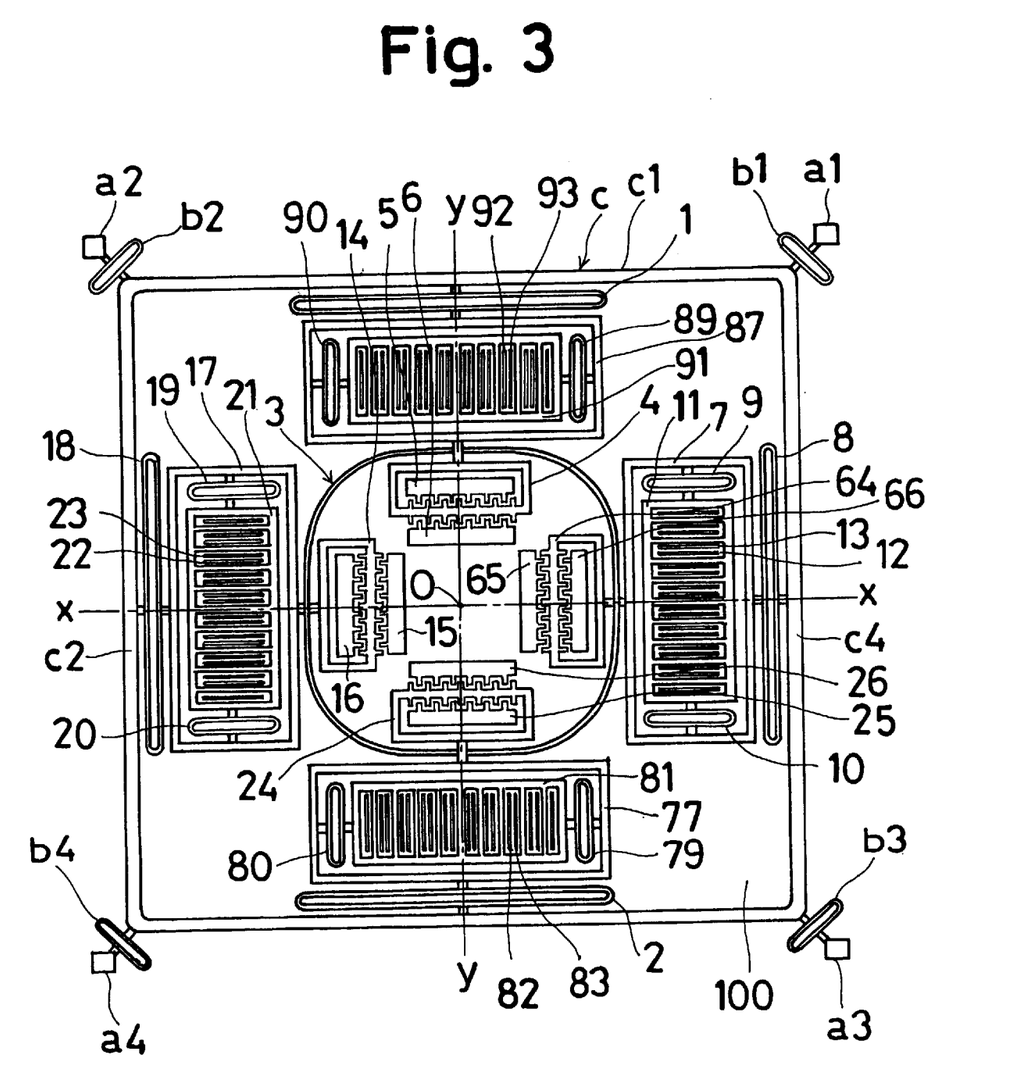
FIG. 3 is a plan view of an angular velocity sensor according to a third embodiment of the present invention.

FIG. 3 illustrates a third embodiment of the angular velocity sensor according to the present invention. According to the third embodiment, the drive frames and vibrators in pairs are additionally disposed in order to adjust the balance of vibrations caused by an angular velocity (y-directional vibrations in the first and second embodiments stated above) around the center 0 of the sensor. More specifically, the sensor is furnished with a third drive frame 77, flat loop spring beams 79, 80, a third vibrator 81, and vibration detection electrodes 82, 83, which are in the same configuration as the configuration obtained when the first drive frame 7, the flat loop spring beams 9, 10, the first vibrator 11 and the vibration detection electrodes 12, 13 as described above are rotated 90 degrees clockwise. Also, a fourth drive frame 87, two flat loop spring beams 89, 90, a fourth vibrator 91, and two vibration detection electrodes 92, 93 are provided. Once again, these components are in the same arrangement as the arrangement obtained when the first drive frame 7, the flat loop spring beams 9, 10, the first vibrator 11 and the vibration detection electrodes 12, 13 as described above are rotated 270 degrees clockwise. Here, all the elements are symmetrically distributed with respect to the x-axis and the y-axis.

When drive voltages (pulses) synchronized with drive the signals A and B are respectively applied to the drive electrodes 5, 6 as stated before, the first and second drive frames 7, 17 are vibrated in opposite phases in the direction of the x-axis, and the third and fourth drive frames 77, 87 are vibrated in opposite phases in the direction of the y-axis. When the angular velocity acts around the z-axis as described above, the first and second vibrators 11, 21 are vibrated in opposite phases in the y-direction, and the third and fourth vibrators 81, 91 are vibrated in opposite phases in the x-direction.

Although not shown, circuit elements similar to the amplifiers 46, 47, 56, 57 and differential amplifiers 48, 58, 49, which are connected to the first and second sets of vibration detection electrodes 12, 13 and 22, 23 illustrated in FIG. 1, may be connected also to the third and fourth sets of vibration detection electrodes 82, 83 and 92, 93. The output of the differential amplifier 49 at the final stage of the first and second vibration detection electrode systems, and that of the differential-amplifier at the final stage of the third and fourth vibration detection electrode systems are applied to the additional differential amplifier. In this way, it is possible to produce a vibration detection signal caused by the angular velocity, in which the detection levels of both the systems are substantially doubled and in which noise components are canceled from each other. The produced signal is applied to the synchronous detection circuit 50 (in, for example, FIG. 1), whereby an angular velocity signal is obtained. In the first and second embodiments, the vibrations caused by the angular velocity are detected in the y-axial symmetry. Here in the third embodiment, the vibrations are also detected in x-axial symmetry. Therefore, the vibrations caused by the angular velocity are balanced more, and the angular velocity signal of higher S/N ratio can be obtained.

Figure 4:
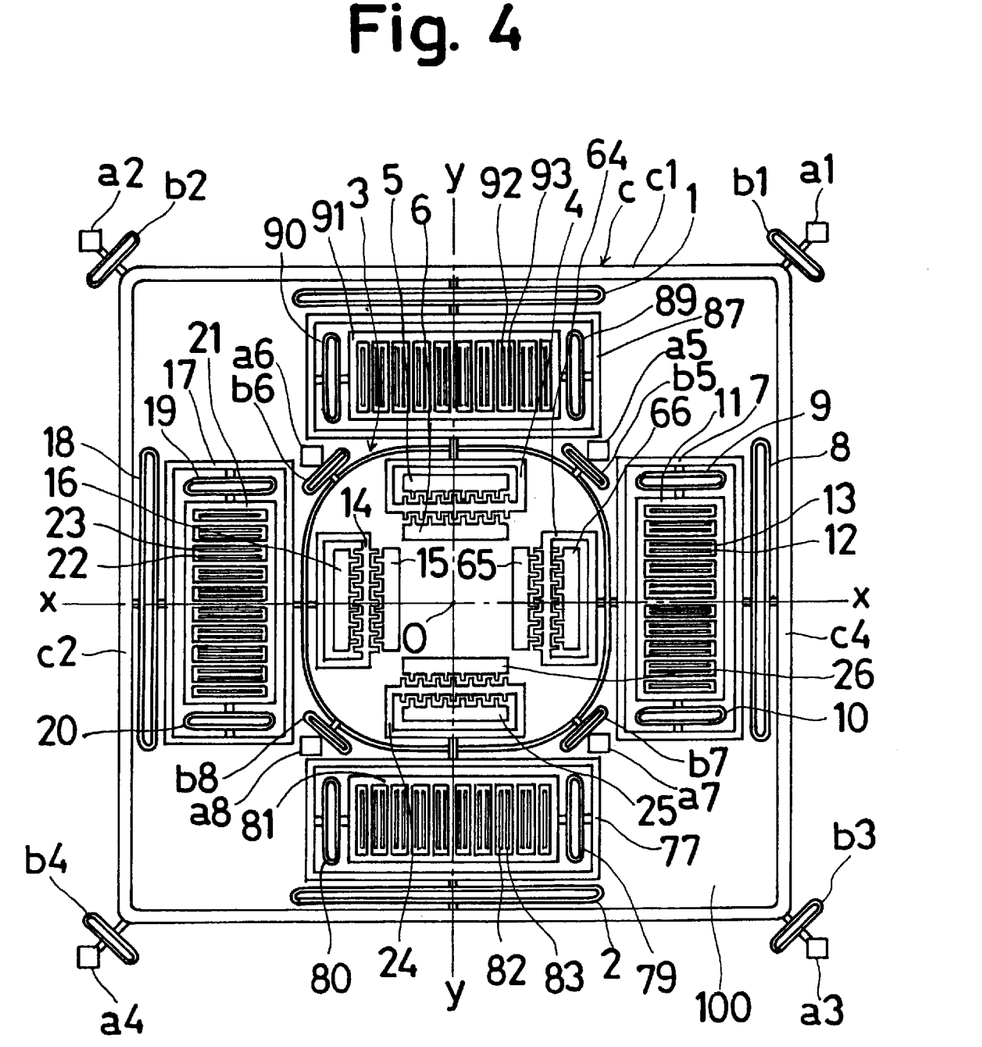
FIG. 4 is a plan view of an angular velocity sensor according to a fourth embodiment of the present invention.

FIG. 4 illustrates a fourth embodiment of the angular velocity sensor of the present invention. The fourth embodiment adopts a further construction to that shown in FIG. 3 in which the immobile points of the drive spring frame 3 are fixedly supported by anchors a5, a6, a7, a8 through loop-shaped spring beams b5, b6, b7, b8. Owing to this construction, the drive spring beam 3 is connected to the ground GND of a detection circuit. Accordingly, the leakage of drive signals is further diminished, and the S/N ratio of an angular velocity signal is further enhanced.

Figure 5:
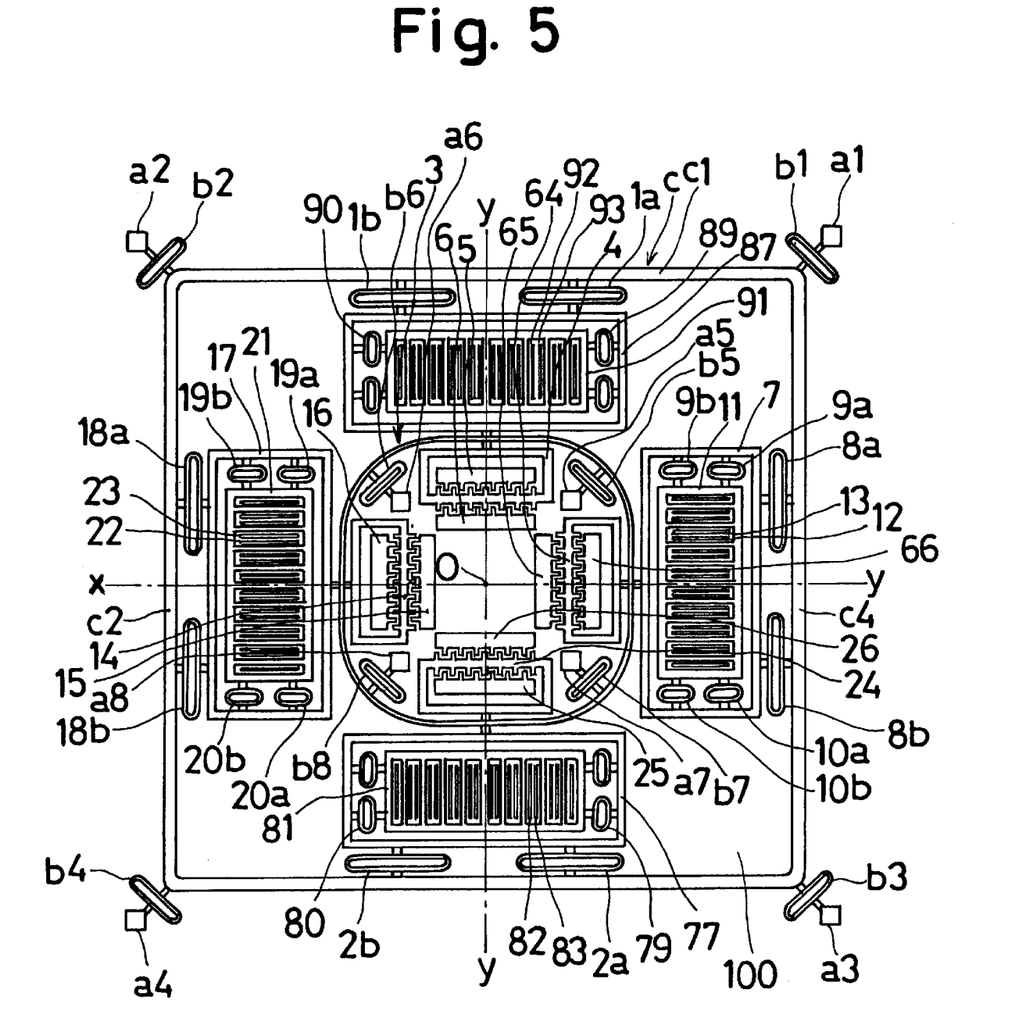
FIG. 5 is a plan view of an angular velocity sensor according to a fifth embodiment of the present invention.

FIG. 5 illustrates a fifth embodiment of the angular velocity sensor of the present invention. In this fifth embodiment, to more further suppress the y-directional vibrations of the first and second drive frames 7, 17 and the x-directional vibrations of the third and fourth drive frames 81, 91, each of the flat loop spring beams is divided into a pair of beams as in the second embodiment. Thus, the flat loop spring beams 8, 9, 10, 18, 19, 20, 1, 89, 90, 2, 79, 80 is divided into a pair of flat loop spring beams 8a/8b, 9a/9b, 10a/10b, 18a/18b, 19a/19b, 20a/20b, 1a/1b, 89a/89b, 90a/90b, 2a/2b, 79a/79b, 80a/80b. Moreover, the immobile points of the drive spring beam 3 are supported by anchors a5, a6, a7, a8 through loop spring beams b5, b6, b7, b8 as in the fourth embodiment. Thus, driving vibrations in the x- and y-directions are effectively separated from vibrations in the x- and y-directions as are to be detected for sensing the angular velocity, and the S/N ratio of the angular velocity signal is enhanced.

Figure 6:
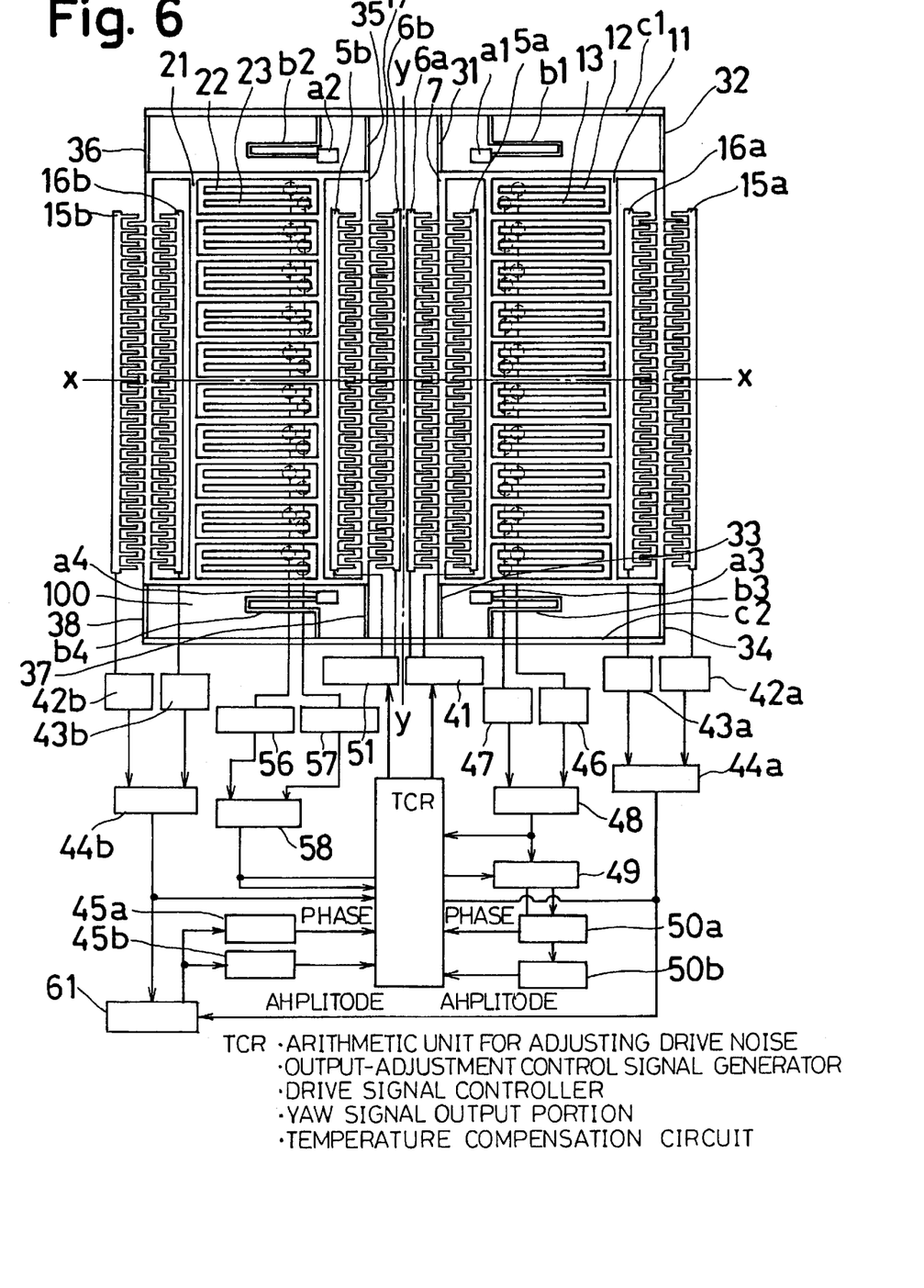
FIG. 6 is a plan view of an angular velocity sensor according to a sixth embodiment of the present invention.

FIG. 6 illustrates a sixth embodiment of the angular velocity sensor according to the present invention. In this embodiment, anchors made of conductive polycrystalline silicon are joined to a silicon substrate 100 formed with an insulator layer. The anchors include floater anchors a1, a2, a3, a4, anchors for the drive electrodes 5a, 5b and 6a, 6b, anchors for the drive detection electrodes 15a, 15b and 16a, 16b, and anchors for the angular-velocity detection electrodes 12, 13 and 22, 23. These anchors are connected to connection electrodes not specifically shown by wiring lines which are formed on the insulator layer overlying the silicon substrate 100.

Using a lithographic semiconductor process, spring beams b1, b2, b3, b4 of conductive polycrystalline silicon, which are highly flexible in the directions of the x-axis and the y-axis, are formed so as to be afloat from the silicon substrate 100 and to be connected to and continuous with the respective corresponding floater anchors a1, a2, a3, a4. Similarly formed are coupling beams c1, c2 each of which is in the shape of a band plate, and connected to and continuous with the spring beams b1, b2, b3, b4. The coupling beams c1, c2 are symmetrical with respect to the x-axis and symmetrically positioned with respect to the y-axis which both pass through the center 0 of the sensor. The floater anchors a1, a2, a3, a4 and the spring beams b1, b2, b3, b4 are also distributed symmetrically with respect to both the x-axis and the y-axis.

A first drive frame 7 is supported by the coupling beam c1 through four spring beams 31, 32, 33, 34 and a second drive frame 17 is supported by the coupling beam c2 through four spring beams 35, 36, 37, 38. The spring beams 31, 32, 33, 34, 35, 36, 37, 38 are highly flexible in the x-direction, are continuous to the coupling beams, and are connected to and continuous with the drive frames 7, 17. The first and second drive frames 7, 17 are rectangular frames, and a first vibrator 11 and a second vibrator 21 are connected to and continuous with the rectangular frames unitarily and inwards. Also these components are afloat from the silicon substrate 100 and are made of conductive polycrystalline silicon.

The first and second drive frames 7, 17, and the first and second vibrators 11, 21 are symmetrical in shape and are at symmetric positions with respect to the x-axis and the y-axis which pass through the center 0 of the sensor. The spring beams 31, 32, 33, 34 and 35, 36, 37, 38 are also symmetric with respect to and symmetrically positioned with respect to the x-axis and y-axis The two latera or sides of each of the first and second drive frames 7, 17 which are parallel to the y-axis include comb-like movable electrodes having fingers or segments extending in the x-direction and distributed at equal pitches or spacing in the y-direction. Each of the drive electrodes 5a, 5b and 6a, 6b and the drive detection electrodes 15a, 15b and 16a, 16b, which are made of the conductive polycrystalline silicon and which are connected to and continuous with the respective corresponding electrode anchors, includes a comb-like fixed electrode having fingers that extend or protrude in the interspaces of the y-directional distribution of the fingers of the movable electrode and are distributed or spaced apart in the y-direction.

Voltages which are higher than the potential of the drive frames 7, 17 (being substantially equal to the earth potential level of the equipment including the sensor), are applied alternately to the drive electrodes 5a, 5b and 6a, 6b, whereby the drive frames 7, 17 are vibrated in the x-direction. To bring the drive frames 7, 17 into resonant tuning fork vibrations, the x-directional vibrations of the drive frames 7, 17 are set in opposite phases relative to each other.

A first vibration system consisting of the drive frame 7 and the vibrator 11 and a second vibration system consisting of the drive frame 17 and the vibrator 21 are caused to perform the resonant fork vibrations, thereby to attain an x-directional oscillation of high energy consumption efficiency. Also, the resonance frequencies of the x-directional vibrations of the first and second drive frames 7, 17 are designed to be equal. To heighten the sensitivity for detecting the angular velocity, the resonance frequencies of the y-directional vibrations of the drive frames are designed to be several hundred Hz higher than the resonance frequencies of the x-directional vibrations.

Because the drive frames 7, 17 perform the resonant fork vibrations in the x-direction, the capacitances between the drive frame 7 and the drive detection electrodes 15a, 16a fluctuate in opposite phases, and the capacitances between the drive frame 17 and the drive detection electrodes 15b, 16b fluctuate in phases opposite to those of the capacitance fluctuations associated with the drive frame 7.

Each of the vibrators 11, 21 that is unitary with the respective drive frame 7, 17 is substantially in the shape of a frame and includes a plurality of gangway or separating beams extending in the x-direction and spaced apart at equal pitches in the y-direction. One pair of fixed detection electrodes 12, 13 and 22, 23 of conductive polycrystalline silicon exists in each interspace between pairs of the gangway beams that are adjacent to each other in the y-direction. These electrodes are supported by the respective corresponding anchors for the detection electrodes on the substrate 100, and are electrically connected to and continuous with the anchors.

Although each pair of detection electrodes 12, 13 (22, 23) is insulated from each other, the detection electrodes of each pair of detection electrodes 12, 13 (22 and 23) which are associated for detecting the y-directional vibration (y-directional displacement) of the vibrator 11 (21) and which lie at corresponding positions between the pairs, are connected in common to an electric lead and then to respective charge amplifiers 46, 47 (56 and 57).

When an angular velocity around the z-axis passing through the center 0 acts during the x-directional fork vibrations of the vibrators 11, 21, these vibrators 11, 21 come perform elliptic vibrations which also have y-axial components and which are in relative opposite phases. Thus, the electrodes 12, 13 and 22, 23 undergo capacitance fluctuations corresponding to the y-directional vibrations. The capacitance fluctuations of the electrodes 12, 13 are in relative opposite phases, and those of the electrodes 22, 23 are similarly in relatively opposite phases. Here, because the y-directional vibrations of the vibrators 11, 21 are in opposite phases, the capacitance fluctuations of the electrodes 12, 22 are in relative opposite phases, and those of the electrodes 13, 23 are similarly in relative opposite phases.

A measurement controller TCR generates drive signals A and B for driving the drive frames 7, 17 at the resonance frequencies in the x-direction and apply the generated signals to the drive circuits 41, 51. The TCR also applies synchronizing signals for synchronous detection to synchronous detection circuits 45a, 45b, 50a, 50b.

The drive circuits 41, 51 apply drive voltages (pulses) to the drive electrodes 5a, 6a and 5b, 6b in synchronism with the respective drive signals A and B. Thus, the vibrators 11, 21 are vibrated in opposite phases in the x-direction together with the respective corresponding drive frames 7, 17. Owing to the vibrations, the capacitances of the drive detection electrodes 15a, 16a and 15b, 16b fluctuate in opposite phases. Charge amplifiers 42a, 43a and 42b, 43b convert the fluctuations of the capacitances into voltage fluctuations (capacitance signals). Output adjustment circuits (variable gain amplifiers) adjust the peak levels of the voltage fluctuations to be substantially equal, and they apply the adjusted levels to differential amplifiers 44a, 44b.

The differential amplifiers 44a, 44b differentially amplify the applied capacitance signals in opposite phases. The differential amplifiers 44a, 44b generate differential signals in each of which the amplitude of one capacitance signal is substantially doubled, and in each of which the noise components of the capacitance signals are canceled from each other. The generated differential signals are subjected to output adjustments (are amplified by variable gain amplifiers), and the resulting signals are applied to the measurement controller TCR and a differential amplifier 61. The differential amplifier 61 differentially amplifies the received signals, and applies the resulting signal to the synchronous detection circuits 45a, 45b. The synchronous detection circuit 45a detects the differential signal applied by the differential amplifier 61, namely an x-directional vibration detection voltage expressive of the x-directional vibration, in synchronism with a synchronizing signal inphase with the drive signal. The synchronous detection circuit 45a generates a phase signal which expresses the phase difference of the x-directional vibration relative to the drive pulse signal. The generated phase signal is applied to the measurement controller TCR. On the other hand, the synchronous detection circuit 45b detects the differential signal applied by the differential amplifier 61, namely an x-directional vibration detection voltage expressive of the x-directional vibration, in synchronism with a synchronizing signal inphase with the drive signal. The synchronous detection circuit 45b generates an amplitude signal which expresses the amplitude of the x-directional vibration. The generated amplitude signal is applied to the measurement controller TCR.

The measurement controller TCR supplies the drive circuits 41, 51 with phase shift signals for bringing phases expressed by the phase signals into agreement with preset values and voltage command signals for bringing the amplitudes of the x-directional vibrations expressed by the amplitude signals into agreement with present values. The drive circuits 41, 51 having received the phase shift signals and the voltage command signals, shift the phases of the output drive voltages relative to the drive signals in correspondence with the phase shift signals, and also shift the levels of the output voltages in correspondence with the voltage command signals. In a state where the phase shift signals and amplitude signals of the synchronous detection circuits 45a, 45b have substantially equalized to the preset values, the x-directional vibrations or resonant fork vibrations of the drive frames 7, 17 are stabilized.

When an angular velocity around the z-axis passing through the center 0 acts during the stable resonant fork vibrations, Coriolis forces act on the drive frames 7, 17 which cause elliptic vibrations containing y-directional vibrations in addition to the x-directional vibrations. Here, the drive frames 7, 17 are supported by the respective spring beams 31, 32, 33, 34 and 35, 36, 37, 38 which are highly flexible in the x-direction but highly rigid in the y-direction, so that the coupling beams $c_1$, $c_2$ vibrate in the y-direction together with the drive frames 7, 17. Because the y-directional vibrations of the drive frames 7, 17 are in opposite phases relative to each other, the coupling beams $c_1$, $c_2$ undergo torsion (swirl) vibrations about the z-axis passing through the center 0.

The capacitances of the pair of detection electrodes 12, 13 for detecting the y-directional vibration of the vibrator 11 that is unitary with the drive frame 7 fluctuate in opposite phases, and the charge amplifiers 46, 47 generate capacitance signals expressive of the fluctuations. Output adjustment circuits (variable gain amplifiers) adjust the peak levels of voltage fluctuations to be substantially equal, and apply the adjusted signals to a differential amplifier 48. The differential amplifier 48 generates the differential signal of both the signals, that is the differential signal in which the amplitude of one capacitance signal is substantially doubled and in which the noise components of the capacitance signals are canceled from each other. The generated differential signal is applied to a differential amplifier 49 after its level has been adjusted by an output adjustment circuit (variable gain amplifier). A similar differential signal, which is based on the capacitances of the pair of detection electrodes 22, 23 for detecting the y-directional vibration of the vibrator 21 that is unitary with the drive frame 17, is applied to the differential amplifier 49. Accordingly, the differential output of the differential amplifier 49 is a detection signal in which the y-directional vibration caused by the angular velocity is amplified, by canceling noise components that simultaneously act on the correspondent signal processing circuits of the first vibrator 11 and second vibrator 21 at substantially the same levels and by canceling the y-directional displacement components (being also noise components) of the first and second vibrators 11, 21 that simultaneously act on these vibrators in the same senses on account of any disturbance such as acceleration, deceleration or vibration. The detection signal affords a high sensitivity for detecting the angular velocity, and a high SIN ratio.

The differential output, namely the detection signal, is applied to the synchronous detection circuits 50a, 50b. The synchronous detection circuit 50a detects the detection signal in synchronism with a synchronizing signal inphase with the drive signal, and generates a phase signal expressive of the direction of the angular velocity. The synchronous detection circuit 50b generates an amplitude signal expressive of the absolute value of the angular velocity.

In this sixth embodiment of the angular velocity sensor, the output adjustment circuits (amplifiers whose gains are adjustable) are included. Therefore, even when the unbalance of the signals in the differential arrangement has developed by any of various reasons, the drive signals are adjusted at the output stages of the charge amplifiers, and if necessary at the input stages of the differential amplifiers, whereby the noise components of the signals for the drive detection and the angular velocity detection can be reduced. In addition, the unbalance between the detection signals can be adjusted. Therefore, the S/N ratio of the angular velocity detection can be, of course, heightened or improved and the available percentage of the articles of the sensor can be heightened to curtail cost.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An angular velocity sensor having a center comprising:
   a loop spring beam which is flexible in an x-axis and a y-axis passing through the center of the sensor, said loop spring beam being supported by floating support members for being vibrated in directions extending along an xy-plane relatively to a substrate;
   oscillation means for driving at least one point of said loop spring beam which intersects said x-axis or y-axis to vibrate in a direction in which said one axis extends;
   a first drive frame and a second drive frame which are continuous with a respective intersection point of said loop spring beam with said x-axis, said first drive frame and second drive frame being located at positions symmetric with respect to said y-axis, and being supported afloat for movement relative to the substrate by support members that are flexible in the direction in which the x-axis extends;
   a first vibrator disposed in said first drive frame and continuous with spring beams that are flexible in the y-direction, the first vibrator being continuous with said first drive frame;
   a second vibrator disposed in said second drive frame and continuous with spring beams that are flexible in the y-direction, the first vibrator being continuous with said second drive frame;
   first displacement detection means for detecting a y-directional vibration of said first vibrator; and
   second displacement detection means for detecting a y-directional vibration of said second vibrator.

2. An angular velocity sensor according to claim 1, further comprising:
   a third drive frame and a fourth drive frame which are respectively continuous with intersection points of said loop spring beam with said y-axis, said third and fourth frames being supported afloat to be movable relatively to said substrate by support members that are flexible in the direction in which said y-axis extends, said third and fourth frames being positioned symmetrically with respect to said x-axis;
   a third vibrator disposed in said third drive frame and continuous with spring beams that are flexible in the x-direction, said third vibrator being continuous to said third drive frame;
   a fourth vibrator disposed in said fourth drive frame and continuous with spring beams that are flexible in the x-direction, said fourth vibrator being continuous to said fourth drive frame;
   third displacement detection means for detecting an x-directional vibration of said third vibrator; and
   fourth displacement detection means for detecting an x-directional vibration of said fourth vibrator.

3. An angular velocity sensor according to claim 1, wherein said first and second vibrators each possess a shape of a frame, said first displacement detection means being located inside said first vibrator, said second displacement detection means being located inside said second vibrator.

4. An angular velocity sensor according to claim 1, wherein said floating support members that support said loop spring beam include first spring beams which cross said y-axis and are flexible in directions in which the y-axis extends, the support members that support said first and second driving frames including second spring beams which cross said x-axis and are flexible in directions in which the x-axis extends.

5. An angular velocity sensor according to claim 4, wherein said floating support members that support said loop spring beam and the support members that support said first and second driving frames also include a frame member and third spring beams, one end of each of said third spring beams being continuous with said frame member and an opposite end of each of said third spring beams being fixed to said substrate.

6. An angular velocity sensor having a center comprising:
   coupling beams which are supported afloat by floating support members so as to be movable relative to a substrate, the floating support members being flexible in directions of an x-axis and a y-axis and being symmetrical with respect to the center of the sensor;
   a first vibrator and a second vibrator supported by a respective one of said coupling beams through spring beams that are flexible in the x-direction, and symmetrical with respect to the x-axis passing through the center, and symmetrical to each other with respect to the y-axis passing through the center;
   oscillation means for driving at least either of said first vibrator and said second vibrator to vibrate in the x-direction;
   first displacement detection means for detecting a y-directional vibration of said first vibrator; and
   second displacement detection means for detecting a y-directional vibration of said second vibrator.

7. An angular velocity sensor according to claim 6, wherein said first vibrator is located within and connected to a first frame and said second vibrator is located within and connected to a second frame, said first and second frames being symmetrically located with respect to said y-axis.

8. An angular velocity sensor having a center comprising:
   a loop spring beam which is flexible in an x-axis and a y-axis passing through the center of the sensor, said loop spring beam being supported by floating support members for being vibrated in directions extending along an xy-plane relatively to a substrate;
   oscillation means for driving at least one point of said loop spring beam to vibrate in a direction in which one of said x-axis and y-axis extends;
   a first drive frame connected to the loop spring beam at a point at which the loop spring beam intersects one of said x-axis and y-axis;
   a second drive frame connected to the loop spring beam at a point at which the loop spring beam intersects one of said x-axis and y-axis, said first drive frame and second drive frame being located at positions symmetric with respect to one of said x-axis and y-axis and being supported for movement relative to the substrate by support members that are flexible in the direction in which the x-axis extends;
   a first vibrator that is connected with said first drive frame;
   a second vibrator that is connected with said second drive frame;
   first displacement detection means for detecting a y-directional vibration of said first vibrator; and
   second displacement detection means for detecting a y-directional vibration of said second vibrator.

* * * * *